United States Patent
Hwa et al.

(10) Patent No.: US 9,604,665 B2
(45) Date of Patent: Mar. 28, 2017

(54) CHARACTERIZATION OF STICTION CONDITION IN A MANUAL STEERING GEAR

(71) Applicant: GM GLOBAL TECHNOLOGY OPERATIONS LLC, Detroit, MI (US)

(72) Inventors: Ian Y. Hwa, West Bloomfield, MI (US); Roderick L. Lemmer, Birmingham, MI (US); Gregory K. Peterson, South Lyon, MI (US); William K. Adams, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 25 days.

(21) Appl. No.: 14/718,465

(22) Filed: May 21, 2015

(65) Prior Publication Data

US 2016/0339943 A1 Nov. 24, 2016

(51) Int. Cl.
*B62D 5/04* (2006.01)
*B62D 3/12* (2006.01)
*B62D 6/08* (2006.01)
*G01L 5/22* (2006.01)
*G01M 17/06* (2006.01)

(52) U.S. Cl.
CPC ............ *B62D 5/046* (2013.01); *B62D 3/12* (2013.01); *B62D 5/0481* (2013.01); *B62D 6/08* (2013.01); *G01L 5/221* (2013.01); *G01M 17/06* (2013.01)

(58) Field of Classification Search
CPC ..... G01M 17/06; B62D 5/046; B62D 5/0481; B62D 3/12; B62D 6/08; G01L 5/221
See application file for complete search history.

(56) References Cited

U.S. PATENT DOCUMENTS

| | | | | |
|---|---|---|---|---|
| 5,700,951 A * | 12/1997 | Sagiyama | ............. | G01M 17/06 73/11.04 |
| 6,407,524 B1 * | 6/2002 | Endo | ...................... | B62D 5/046 318/432 |
| 6,876,910 B2 * | 4/2005 | Kifuku | ................ | B62D 5/0466 701/41 |
| 7,742,899 B2 * | 6/2010 | Lemont, Jr. | ........... | G01M 7/027 180/444 |
| 8,175,771 B2 * | 5/2012 | Ukai | ...................... | B62D 5/046 701/41 |
| 2007/0205040 A1 * | 9/2007 | Miyasaka | ............. | B62D 5/001 180/444 |

(Continued)

*Primary Examiner* — Dale W Hilgendorf
(74) *Attorney, Agent, or Firm* — Quinn Law Group, PLLC

(57) ABSTRACT

A method for characterizing a stiction condition in a manual steering gear includes transmitting a steering input control signal to a rotary actuator, and rotating a steering shaft with constant acceleration, via the rotary actuator, in response to the steering input control signal. A steering output torque is determined while rotating the steering shaft with the constant acceleration, receiving the steering output torque via the controller, and executing a control action when a rate of the received steering output torque exceeds a threshold rate indicative of the stiction condition. A system includes a rotary actuator, a manual steering gear having a steering shaft connected to the rotary actuator, a torque transducer for measuring a steering output torque imparted to the steering shaft by the actuator, and a controller programmed as set forth above.

7 Claims, 2 Drawing Sheets

(56) References Cited

U.S. PATENT DOCUMENTS

2011/0190984 A1* 8/2011 Reeve .................... G01M 17/06
                                                        701/41
2012/0173079 A1* 7/2012 Oblizajek ............. G01M 17/06
                                                        701/41

* cited by examiner

CHARACTERIZATION OF STICTION CONDITION IN A MANUAL STEERING GEAR

TECHNICAL FIELD

The present disclosure relates to a method and a system for characterizing a stiction condition in a manual steering gear.

BACKGROUND

Vehicular rack and pinion steering systems include an elongated flat gear or rack having teeth which mesh with mating teeth of a rotating pinion gear. The pinion gear is mounted on an end of a steering shaft. As a steering angle is imparted to the steering shaft, e.g., via rotation of a steering wheel, the pinion gear rolls along the rack, which in turn moves the rack in a corresponding steering direction. Tie rods are disposed at the distal ends of the rack. The tie rods ultimately connect to the front road wheels of a vehicle via a corresponding steering arm. Therefore, a rack and pinion steering system effectively converts rotational motion of a steering wheel into linear motion suitable for steering the vehicle, while also providing a suitable level of gear reduction.

Due to manufacturing tolerances and/or gear wear, impingement may result in the meshing gears of the rack and pinion portion of a manual steering gear. A transient stick-slip condition known as "stiction" may result. Transient stiction during execution of a steering maneuver can affect steering precision and feel, particularly in electronic power-assisted steering systems imparting steering assist along the steering column. However, the transient nature of the stiction condition makes such a condition difficult to properly isolate, diagnose, and correct.

SUMMARY

A method and system are disclosed herein for quantifying a threshold torque breakaway condition, i.e., a stiction condition, in a manual steering gear. The method generates a stiction metric based on a rate or slope of detected torque breakaway in a test environment as set forth herein. Traditional vehicle steering test processes typically focus on steering kinematics and evaluating steady-state performance while largely ignoring certain transient characteristics, which are found herein to be indicative of the stiction condition noted above. Therefore, the present method uses components of a test system to impart closely controlled steering input control signals to a manual steering gear, determine a torque breakaway rate, compare the torque breakaway rate to a threshold rate, and execute a control action indicative of a detected stiction condition when the threshold rate is exceeded. An ultimate goal of the present approach is to improve the overall design of the manual steering gear while facilitating validation of the manual steering gear relative to existing steering test systems and methods.

In a particular embodiment, a method for characterizing the stiction condition in a manual steering gear includes transmitting a steering input control signal from a controller to a rotary actuator, e.g., a commanded steering angle to an electric steering motor. The method also includes rotating a steering shaft of the manual steering gear with constant acceleration via the rotary actuator in response to the steering input control signal. A steering output torque value is measured with respect to the steering axis using a torque transducer simultaneously with rotation of the steering shaft. The controller may thereafter record a diagnostic code and/or take other suitable control actions when a rate of the received measured steering output torque value exceeds a threshold rate indicative of the stiction condition.

A system includes the rotary actuator, the manual steering gear, the torque transducer, and a controller programmed to characterize a threshold torque breakaway or stiction condition in the manual steering gear as set forth above.

In another embodiment, a method for characterizing a stiction condition in a manual steering gear connected to a steering shaft includes transmitting a steering input control signal in the form of a commanded steering angle from a controller to an electric steering motor. The method also includes transmitting a steering input control signal in the form of a commanded steering angle from a controller to an electric steering motor, and then rotating the steering shaft with constant acceleration, via the electric steering motor, in response to the steering input control signal. Additionally, the method includes measuring a steering output torque from the rotary actuator using a torque transducer while rotating the steering shaft with the constant acceleration, receiving the steering output torque via the controller, and executing a control action via the controller when a rate of the received steering output torque exceeds a threshold rate of about 0.4 Nm/s indicative of the stiction condition. The control action in this embodiment includes recording a diagnostic code in memory of the controller.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
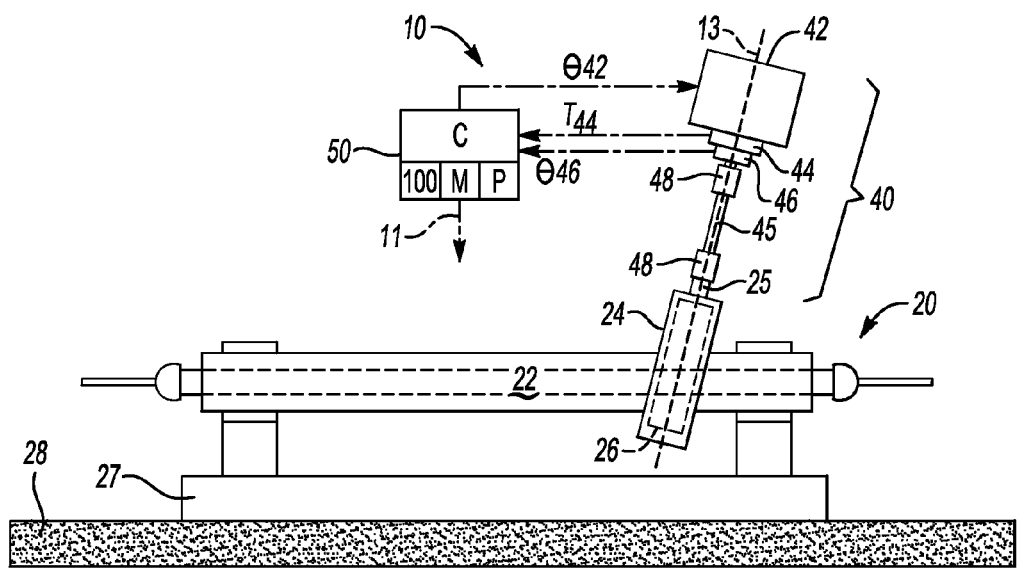
FIG. 1 is a schematic depiction of a test system for characterizing a stiction condition in a manual steering gear as described herein.

Referring to the drawings, wherein like reference numbers refer to like components throughout the several views, an example test system 10 is shown schematically in FIG. 1. The test system 10 includes a manual steering system 20, steering control hardware 40, and a controller (C) 50 programmed to execute logic embodying a method 100 using the control hardware 40. Execution of the method 100 results in the characterization of a torque breakaway condition in the manual steering system 20 as set forth below with reference to FIGS. 2A-4.

The manual steering gear 20 may be embodied as a rack and pinion steering gear of the type known in the art. As such, the manual steering gear 20 includes a rack 22, a gear housing 24, and a steering shaft 25. The gear housing 24 contains a rotatable pinion gear 26. As a steering input control signal (arrow $\theta_{42}$) in the form of a commanded steering angle is imparted to the steering shaft 25 about a steering axis 13, the pinion gear 26 disposed within the gear housing 24 engages with mating gears of the rack 22 and thus translates along the rack 22. This motion in turn moves the rack 22 in a corresponding direction to thereby steer the front wheels of a vehicle (not shown) within which the manual steering gear 20 is used, whether as part of a purely manual steering system or an electrically-assisted steering system. To facilitate the test described below, the test system 10 may include a fixture 27 and base plate 28 which together secure the manual steering system 20 within a test environment.

The control hardware 40 shown in FIG. 1 includes a rotary actuator 42, e.g., an electric motor, as well as a torque transducer 44 and a rotary encoder 46, each of which is coaxially aligned with each other on the steering axis 13 of the steering shaft 25. Because axial variation may be present in the control hardware 40, an extension shaft 45 may be coupled to the steering shaft 25 via a set of flexible couplings 48 as shown. The flexible couplings 48 are intended to facilitate connection of the rotary actuator 42 to the steering shaft 25.

Figure 4:
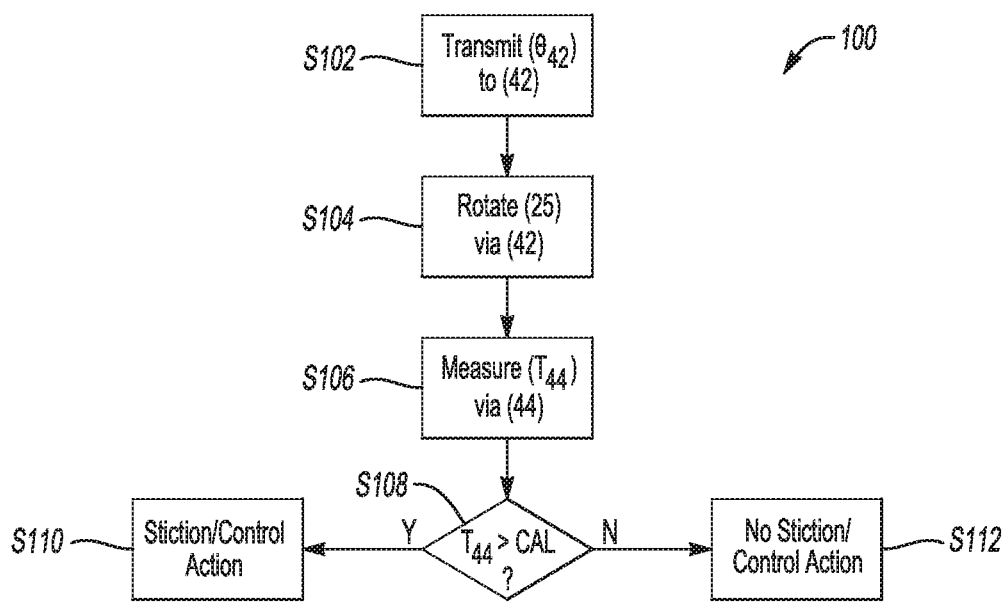
FIG. 4 is a flow chart describing an example method for quantifying torque breakaway characteristics of a manual steering gear using the test system shown in FIG. 1.

The controller 50 used as part of the test system 10 may be configured as a host machine, e.g., a digital computer or microcomputer, that is specially programmed to execute steps of the method 100, an example of which is shown in FIG. 4. To that end, the controller 50 is configured with sufficient hardware to perform the required steps, i.e., with sufficient memory (M), a processor (P), and other hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like. As part of the method 100, the controller 50 receives and a measured steering angle signal ($\theta_{46}$) from the rotary encoder 46, as well as records a measured steering output torque value (arrow $T_{44}$) from the torque transducer 44 and outputs the commanded steering input control signal (arrow $\theta_{42}$) to the rotary actuator 42.

Figure 2A:
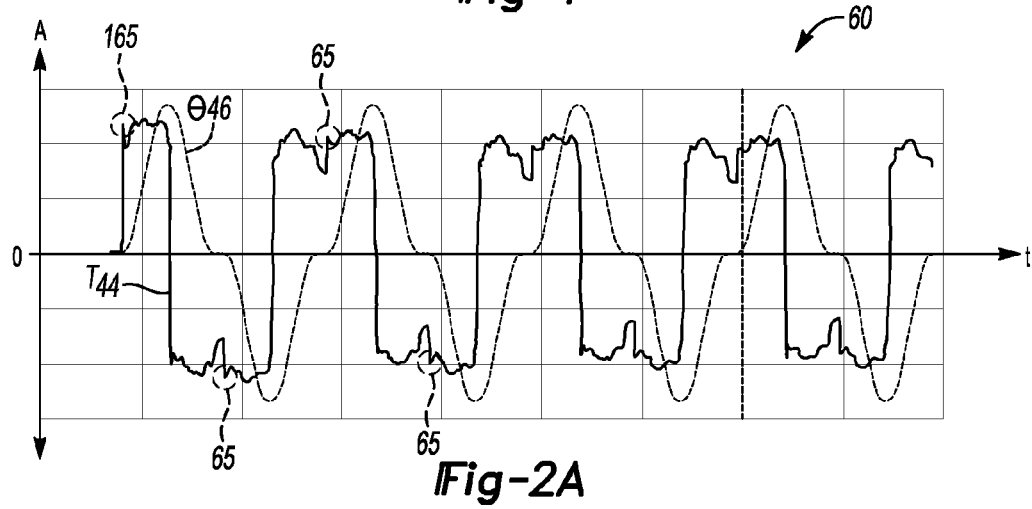
FIG. 2A is a representative time plot of steering output torque and steering angle depicting performance of a properly functioning manual steering gear, with amplitude plotted on the vertical axis and time plotted on the horizontal axis.
Figure 2B:
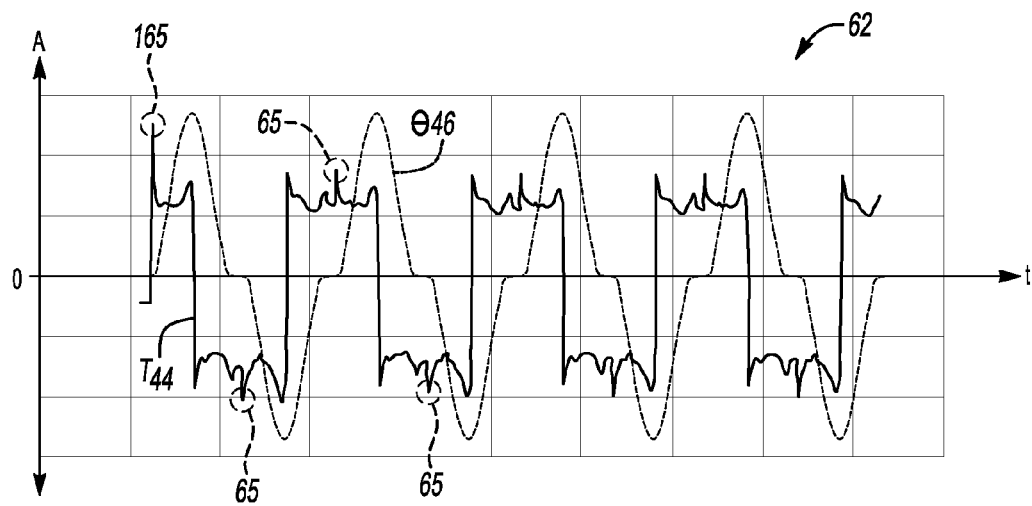
FIG. 2B is an example time plot of a steering output torque value and a steering angle depicting performance of a properly functioning manual steering system exhibiting torque breakaway characteristics, with amplitude plotted on the vertical axis and time plotted on the horizontal axis.

Example traces 60 and 62 are shown in FIGS. 2A and 2B, respectively, to illustrate the measured steering output torque value ($T_{44}$) and the measured steering angle signal ($\theta_{46}$) noted above. Amplitude (A) is plotted on the vertical axis, while time (t) is plotted on the horizontal axis. Zones 65 coincide with an initiation of rotational motion via the rotary actuator 42 in either a left (−) or a right (+) turn direction, e.g., counterclockwise or clockwise with respect to the steering axis 13. For instance, the upper and lower ranges of any commanded steering angle from the commanded steering input control signal (arrow $\theta_{42}$) depicted in FIGS. 2A and 2B may correspond to ±50°, while the measured steering output torque value ($T_{44}$) may correspond to ±3 Nm, without necessarily being limited to such ranges.

Within a given zone 65, steering torque disturbances can be detected in the measured steering output torque value ($T_{44}$). The controller 50 of FIG. 1 is programmed to examine a rate of change or slope of the received measured steering output torque value ($T_{44}$) within a 1 second window after initialization of motion in either rotational direction and after a maximum rate of torque increase has been attained, and to compare the calculated rate or slope value to a calibrated threshold rate or slope as part of the method 100. FIG. 2A is representative of an acceptable torque response. For example, torque breakaway rates of between about 0 Nm/s and 0.5 Nm/s may be considered as acceptable in some example designs, or between about 0 Nm/s and 0.3 Nm/s in other example designs, without limiting acceptable responses to such values.

By way of contrast, the traces 62 of FIG. 2B depict an example unacceptable torque breakaway response. Note that within a given zone 65, steering torque disturbances are more pronounced relative to those of FIG. 2A. Torque breakaway rates above about 0.4 Nm/s or 0.5 Nm/s may be considered as unacceptable in some example designs, or above about 0.3 Nm/s in other designs, without being limiting acceptable responses to such values. As part of the method 100, the controller 50 of FIG. 1 may be programmed to examine each zone 65 after initial startup for a calibrated duration or number of steering cycles for both steering directions, and may use the average of the calculated torque breakaway rates in each steering direction in making any determination as to the severity.

Figure 3:
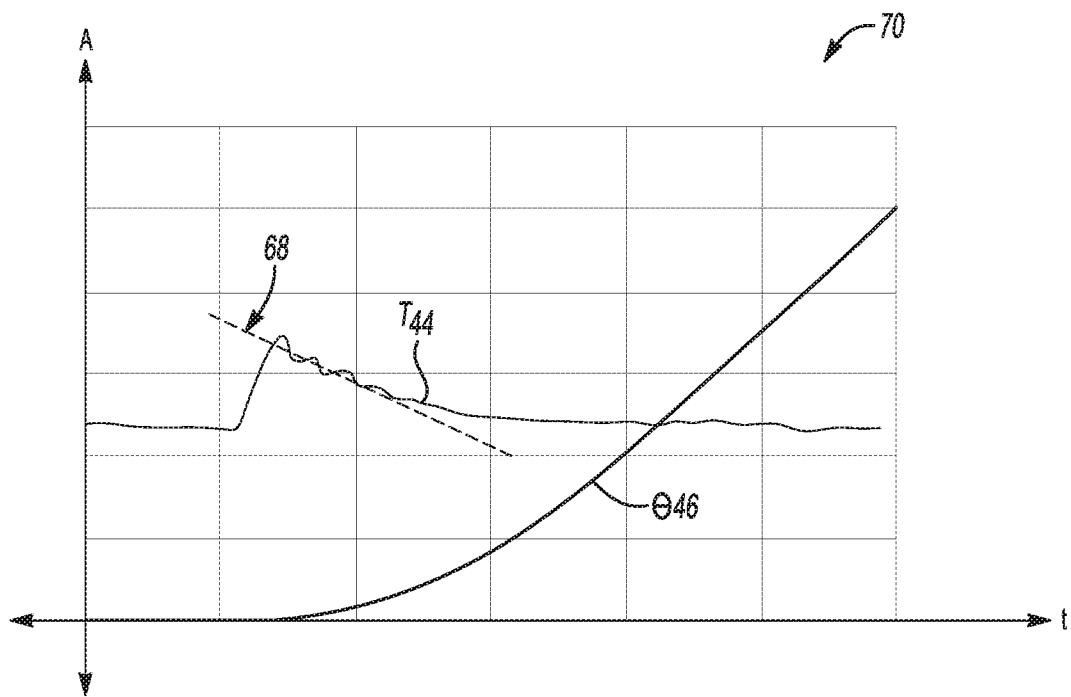
FIG. 3 is an example time plot of a steering output torque value and a steering angle depicting an example threshold torque breakaway rate, with amplitude plotted on the vertical axis and time plotted on the horizontal axis.

FIG. 3 depicts a set of traces 70 describing an example portion of a torque breakaway response. As with FIGS. 2A and 2B, amplitude (A) is plotted on the vertical axis and time (t) is plotted on the horizontal axis. As the measured steering angle signal ($\theta_{46}$) increases, the controller 50 of FIG. 1 detects a torque breakaway condition in zones 65 of FIGS. 2A and 2B, and in particular calculates the rate of change or slope of the torque breakaway response within a 1 s window as described above. This rate is indicated in FIG. 3 by slope line 68. Any torque spike associated with the first initiation of motion, indicated via zone 165, may be discounted due to lack of repeatability.

Thus, in a particular embodiment it is the rate of the torque breakaway response and not its amplitude that is considered in making control decisions as part of the method 100. While the amplitude of a torque breakaway condition may be perceived by a driver, if the torque breakaway occurs gradually the driver may not perceive this as undesirable or, as in an electrically-assisted steering system, the condition may be remedied with an appropriately designed and tuned assist algorithm. However, if torque breakaway occurs quickly relative to a calibrated standard, even at lower amplitudes, such a response may be perceived by the driver and can result in a degraded steering feel. For this reason, it may be advantageous for the controller 50 to use the rate of change as the primary determining factor in evaluating the torque breakaway response of the manual steering gear 20 of FIG. 1.

Referring to FIG. 4, an example embodiment of the method 100 for characterizing a torque breakaway condition in the manual steering gear 20 of FIG. 1 begins with step S102, wherein the controller 50 transmits the steering input control signal (arrow $\theta_{42}$) to the rotary actuator 42, for instance as a commanded steering angle. The method 100 then proceeds to step S104.

At step S104, the rotary actuator 42 rotates the steering shaft 25 with constant acceleration in response to the steering input control signal (arrow $\theta_{42}$) from step S102. That is, steering acceleration is closely controlled by the controller 50 of FIG. 1 to ensure a smooth steering response. The purpose of ensuring constant acceleration in the steering input at step S104 is to ensure that any torque disturbances detected as part of the method 100 are due to a torque breakaway condition as gear impingement ceases, and not from action of the rotary actuator 42. The method 100 proceeds to step S106 as the steering shaft 25 is rotated at with constant acceleration.

Step S106 includes measuring a steering output torque from the rotary actuator 42. For instance, as shown in FIG. 1 a torque transducer 44 may be connected coaxially along the steering axis 13 of the steering shaft 25 such that a rotation of the rotary actuator 42 imparts a steering output torque measured by the torque transducer 44. The torque transducer 44 in turn transmits the measured steering output torque (arrow $T_{44}$) to the controller 50. The method 100 then proceeds to step S108.

At step S108, the controller 50 of FIG. 1 next receives the measured steering output torque (arrow $T_{44}$) and determines if the received measured steering output torque changes above a calibrated rate. Such a rate may be determined offline during testing, as the rate may be expected to vary with the particular design of the steering gear 20, the steering system and vehicle it is used within, etc. That is, some rates may be perceptible as a torque disturbance through the steering column by a driver of a vehicle and others will not be, with the calibrated rate set in logic of the controller 50 for the particular manual steering gear 20 to be tested. The method 100 proceeds to step S110 if the received measured steering output torque changes above the calibrated rate, as indicated by "Y" in FIG. 4. Otherwise, the method 100 proceeds to step S112 as indicated by "N".

Step S110 may include executing a control action with respect to the manual steering system 20 of FIG. 1. For instance, the controller 50 may record, via the output signal (arrow 11 of FIG. 1), a first diagnostic code when the rate of the received measured steering output torque ($T_{44}$) exceeds the threshold rate or slope noted above with reference to step S108, i.e., a rate indicative of a stiction condition. Additional control steps may entail using the first diagnostic code to validate a given design of the manual steering gear 20, such as by rejecting a given design in a validation process or building a design specification.

Step S112 is reached when the rate of the received measured steering output torque ($T_{44}$) is at or below the threshold rate, or in other words, when no perceptible stiction or gear impingement condition is detected via the testing. Step S112 may entail recording a second diagnostic code via the controller 50, i.e., via the output signal (arrow 11 of FIG. 1), when the rate of the received measured steering output torque ($T_{44}$) does not exceed the calibrated threshold rate noted above with reference to step S108. As step S112 indicates a properly-functioning manual steering gear 20, additional control steps may entail using the second diagnostic code to validate a given design of the manual steering gear 20, such as by accepting a given design in a validation process or building a design specification.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system comprising:
an electric steering motor;
a manual steering gear;
a steering shaft connected to the manual steering gear and the electric steering motor;
a torque transducer operable for measuring a steering output torque imparted to the steering shaft by the electric steering motor; and
a controller programmed to detect and characterize a stiction condition in the manual steering gear, and wherein execution of instructions by the controller causes the controller to:
transmit a steering input control signal in the form of a commanded steering angle to the electric steering motor to command the electric steering motor to rotate the steering shaft with a constant acceleration;
command the torque transducer to measure the steering output torque while the rotary actuator rotates the steering shaft with the constant acceleration;
receive the measured steering output torque from the torque transducer while the steering shaft rotates with the constant acceleration;
calculate a rate of change of the received steering output torque; and
execute a control action with respect to the manual steering gear when a rate of change of the received steering output torque exceeds a threshold rate indicative of the stiction condition, including recording a diagnostic code indicative of the detected stiction condition.

2. The system of claim 1, wherein the controller is programmed to further execute the control action by rejecting the manual steering gear in a design validation process when the diagnostic code is recorded.

3. The system of claim 1, wherein the threshold rate is greater than about 0.4 Nm/s.

4. The system of claim 1, wherein the manual steering gear includes a rack and a pinion gear disposed on an end of the steering shaft, and wherein the pinion gear is in meshing engagement with the rack.

5. A method for detecting and characterizing a stiction condition in a manual steering gear connected to a steering shaft, the method comprising:
transmitting a steering input control signal in the form of a commanded steering angle from a controller to an electric steering motor;

rotating the steering shaft and the manual steering gear with a constant acceleration, via the electric steering motor, in response to the steering input control signal;

measuring a steering output torque from the electric steering motor using a torque transducer while rotating the steering shaft and the manual steering gear with the constant acceleration;

receiving the steering output torque via the controller;

calculating a rate of change of the received steering output torque; and executing a control action via the controller when a rate of change of the received steering output torque exceeds a threshold rate of about 0.4 Nm/s indicative of the stiction condition, including recording a diagnostic code in memory of the controller.

6. The method of claim 5, wherein the manual steering gear includes a rack and a pinion gear disposed on an end of the steering shaft, wherein the pinion gear is in meshing engagement with the rack, and wherein rotating the steering shaft at the constant acceleration includes rotating the pinion gear with respect to the rack.

7. The method of claim 5, wherein executing the control action includes rejecting the manual steering gear in a design validation process when the diagnostic code is recorded.

* * * * *